United States Patent [19]
Yang et al.

[11] Patent Number: 6,052,057
[45] Date of Patent: Apr. 18, 2000

[54] SYSTEM FOR CHECKING GAS PRESSURE AND GAS LEAKAGE

[75] Inventors: Young-soo Yang; Kap-hyun Cha, both of Yongin-gun, Rep. of Korea

[73] Assignee: Samsung Electronics Co., Ltd., Suwon, Rep. of Korea

[21] Appl. No.: 08/889,436

[22] Filed: Jul. 8, 1997

[30] Foreign Application Priority Data

Jul. 8, 1996 [KR] Rep. of Korea ...................... 96-27505

[51] Int. Cl.⁷ .................................................. G08B 21/00
[52] U.S. Cl. ........................ 340/605; 340/611; 340/626; 73/40.5 R
[58] Field of Search ..................................... 340/605, 611, 340/626, 632; 137/557; 73/40.5 R

[56] References Cited

U.S. PATENT DOCUMENTS

| | | | |
|---|---|---|---|
| 3,778,769 | 12/1973 | Hong et al. | 340/605 |
| 4,088,985 | 5/1978 | Saito et al. | 340/605 |
| 4,551,718 | 11/1985 | Cookson et al. | 340/825.16 |
| 4,587,619 | 5/1986 | Converse et al. | 340/605 |
| 4,797,668 | 1/1989 | Zimmer | 340/857 |
| 4,815,840 | 3/1989 | Benayad-Cherif et al. | 356/1 |
| 4,876,530 | 10/1989 | Hill et al. | 340/605 |
| 5,005,005 | 4/1991 | Brossia et al. | 340/605 |
| 5,214,387 | 5/1993 | Fenner | 340/605 |
| 5,261,268 | 11/1993 | Namba | 340/605 |
| 5,372,032 | 12/1994 | Filippi | 340/605 |
| 5,502,435 | 3/1996 | Ralston | 340/605 |
| 5,551,285 | 9/1996 | Gannon et al. | 340/605 |
| 5,554,976 | 9/1996 | Miyauchi et al. | 340/626 |
| 5,572,327 | 11/1996 | Plinke et al. | 340/605 |
| 5,578,993 | 11/1996 | Sitabkhan et al. | 340/605 |
| 5,708,195 | 1/1998 | Kurisu et al. | 340/605 |

*Primary Examiner*—Daniel J. Wu
*Assistant Examiner*—Anh La
*Attorney, Agent, or Firm*—Jones Volentine, L.L.P.

[57] ABSTRACT

A system is disclosed for checking gas pressure and gas leakage in one or more gas cylinders. The system particularly detects the state of gas pressure in a gas cylinder during ion-implantation, monitors for the existence of any gas leaks in the gas cylinders, and informs the manufacture process manager of the results of checking and monitoring using a communications device. This minimizes any loss of time due to equipment stoppage and protecting workers from any poisonous gas leaks. This improved system includes one or more gas checking units for checking gas pressure in one or more gas cylinders and detecting gas leaks from the one or more gas cylinders; a signal processor for processing information received from the one or more gas checking units and converting the information into a signal format suitable for transmission; a transmitting unit for transmitting the converted signal received from the signal processor along a communications line; and a display for displaying information based on the transmitted signal.

16 Claims, 3 Drawing Sheets

SYSTEM FOR CHECKING GAS PRESSURE AND GAS LEAKAGE

BACKGROUND OF THE INVENTION

The present invention relates generally to a system for checking gas pressure and gas leakage. More specifically, the present invention relates to a system that detects a state of gas pressure in a gas storage unit that functions as a main gas supply during an ion-implantation process. The system also monitors for gas leaks from the gas storage unit and informs the semiconductor manufacture process manager of the results of this checking and monitoring using a communications device. This minimizes the loss of time due to equipment stoppage and protects workers from a poisonous gas in the event of any leaks.

Since gas is used as an essential material in the manufacture of semiconductor devices, it is important to ensure a continuous gas supply during a semiconductor manufacturing process. This has the desirable effect of improving the efficiency of manufacturing operation. If poisonous gas is used, however, it is also important to continually check whether of any of the poisonous gas leaks from the gas cabinet.

FIG. 1 shows a conventional ion implanter. As shown in FIG. 1, the ion implanter comprises a gas storage unit 10, a main gas supply passage 20, an ion source chamber 30, an analyzer 40, an acceleration tube 50, a focusing unit 60, and an injector 70. As shown in FIG. 2, the gas storage unit 10 includes a plurality of gas cylinders 11a, 11b, 11c, and 11d for storing the gas used as an ion source. The ion source chamber 30 admits the gas from the gas cylinders 11a–11d through the main gas supply passage 20 and ionizes the gas to create an ion beam. The analyzer 40 selects a specified ion beam from the different ion beams generated during the ionization process. The acceleration tube 50 accelerates the ion beam selected by the analyzer 40. The focusing unit 60 focuses the accelerated ion beam. And the injector 70 injects the focused ion beam into a wafer to be processed.

FIG. 2 is a schematic diagram of the gas storage unit 10 of FIG. 1. As shown in FIG. 2, the gas storage unit 10 comprises gas cylinders 11a–11d, stop valves 12a, 12b, 12c, and 12d, first measuring instruments 13a, 13b, 13c, and 13d, second measuring instruments 14a, 14b, 14c, and 14d, and sub gas supply passages 15a, 15b, 15c, and 15d. The gas cylinders 11a–11d store various gases. The stop valves 12a–12d control the gas-supply and gas-interception to the respective gas cylinders 11a–11d. The sub gas supply passages 15a–15d are connected to the respective gas cylinders 11a–11d, through which the gas in the gas cylinders flows into a main gas supply passage 20. The first measuring instruments 13a–13d and the second measuring instruments 14a–14d are each provided at the sub gas supply passages 15a–15d for measuring gas pressure when the gas is emitted to the sub gas supply passages 15a–15d by the pressure in the cylinder itself.

The operation of such an ion implanter is described below.

The gas such as $BF_3$ or $AsH_3$ is supplied to the ion source chamber 30 via the sub gas supply passages 15a–15d and the main gas supply passage 20. The gas is ionized in the ion source chamber 30, and is then transmitted to the analyzer 40.

Next, the classifier 40 selects an ion beam such that only $^+B^{11}$ and $^+As^{75}$ are chosen from the entire ion beam that results by the ionization process. This selected ion beam is then accelerated by the acceleration tube 50 using energy of about 150 to 300 kV. Subsequently, the accelerated ion beam is focused by the focusing unit 60, and is injected into the wafer by the injector 70.

This ion implanter includes many disadvantages, however. For example, it is impossible to detect when a cylinder becomes empty because no way is provided to examine the gas pressure in the cylinders. This also further complicates the management of equipment based upon the prearranged plan. Serious time loss is inescapable when more than two of the gas cylinders are empty. This time loss results from the fact that the entire device must be stopped from the time at which the gas should be changed until the examination of renewed gas pressure is completed. In addition, to properly confirm the state of gas pressure just after the gas cylinders are changed, a worker should open the gas storage unit 10 and physically observe the first and the second measuring instruments disposed on the respective cylinders. In this confirmation step, serious accidents can be occur if a poisonous gas leaks during the time when the worker has opened the gas storage unit 10.

SUMMARY OF THE INVENTION

In view of the above, it is an object of the present invention to provide a system for checking gas pressure that minimizes the time lost in equipment operation by the replacement of used gas cylinders with new gas cylinders. These cylinders must be replaced before the gas pressure in a given cylinder is below a desired threshold or before the gas cylinder is completely empty.

It is the other object of the present invention to provide a system for checking gas pressure which minimizes injury or loss of life due to exposure to poisonous gas, by continually checking for the presence of gas leaks from the gas cylinders employed in the gas storage.

To achieve these objects, according to the present invention, this improved system comprises one or more gas checking units for checking gas pressure in one or more gas cylinders and detecting gas leaks from the one or more gas cylinders; a signal processor for processing information received from the one or more gas checking units and converting the information into a signal format suitable for transmission; a transmitting unit for transmitting the converted signal received from the signal processor along a communications line; and a display for displaying information based on the transmitted signal.

In another aspect of the present invention, the signal processor comprises one or more ports for respectively receiving one or more signals from the one or more gas checking units; a signal amplifier for amplifying the one or more signals respectively received by the one or more ports and producing a single amplified signal; and an analog-to-digital converter for converting the single amplified signal from analog format to digital format.

DETAILED DESCRIPTION OF THE PREFERRED EMBODIMENTS

The present invention is described below with reference to the appending drawings.

Figure 1:
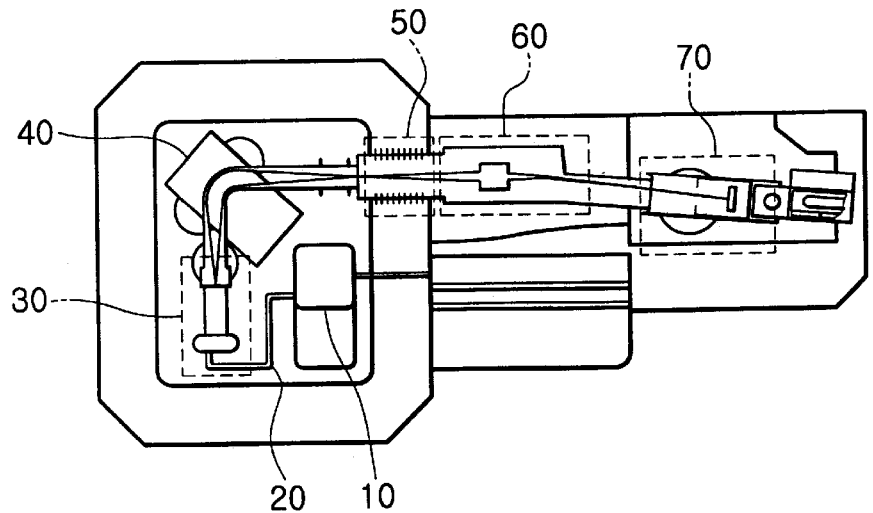
FIG. 1 shows a conventional ion implanter.
Figure 2:
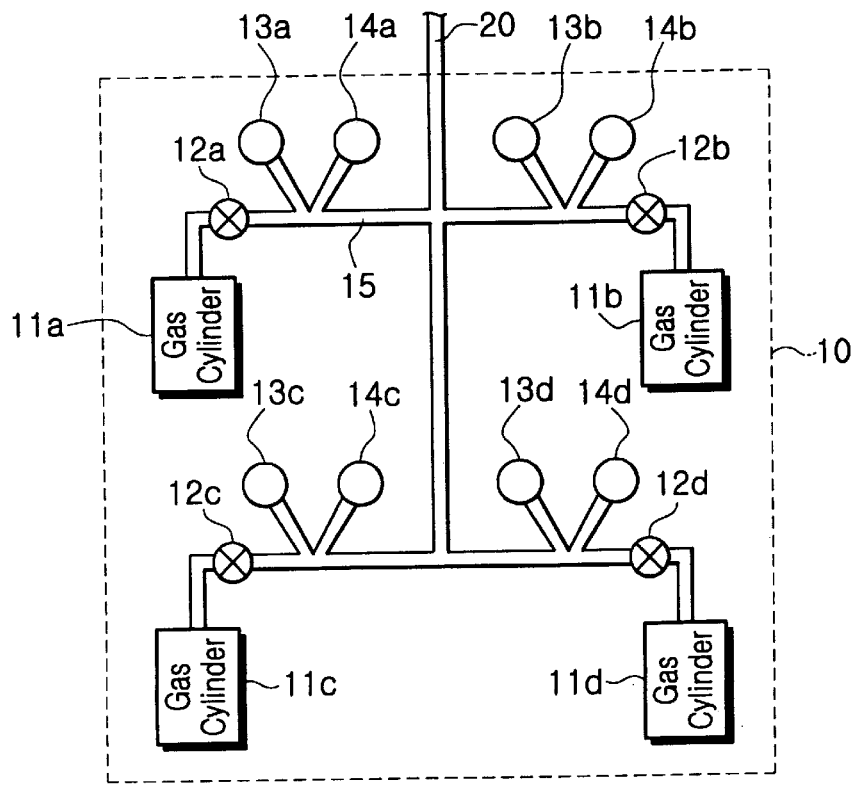
FIG. 2 is a schematic diagram of a gas cabinet employed in the ion implanter of FIG. 1.
Figure 3:
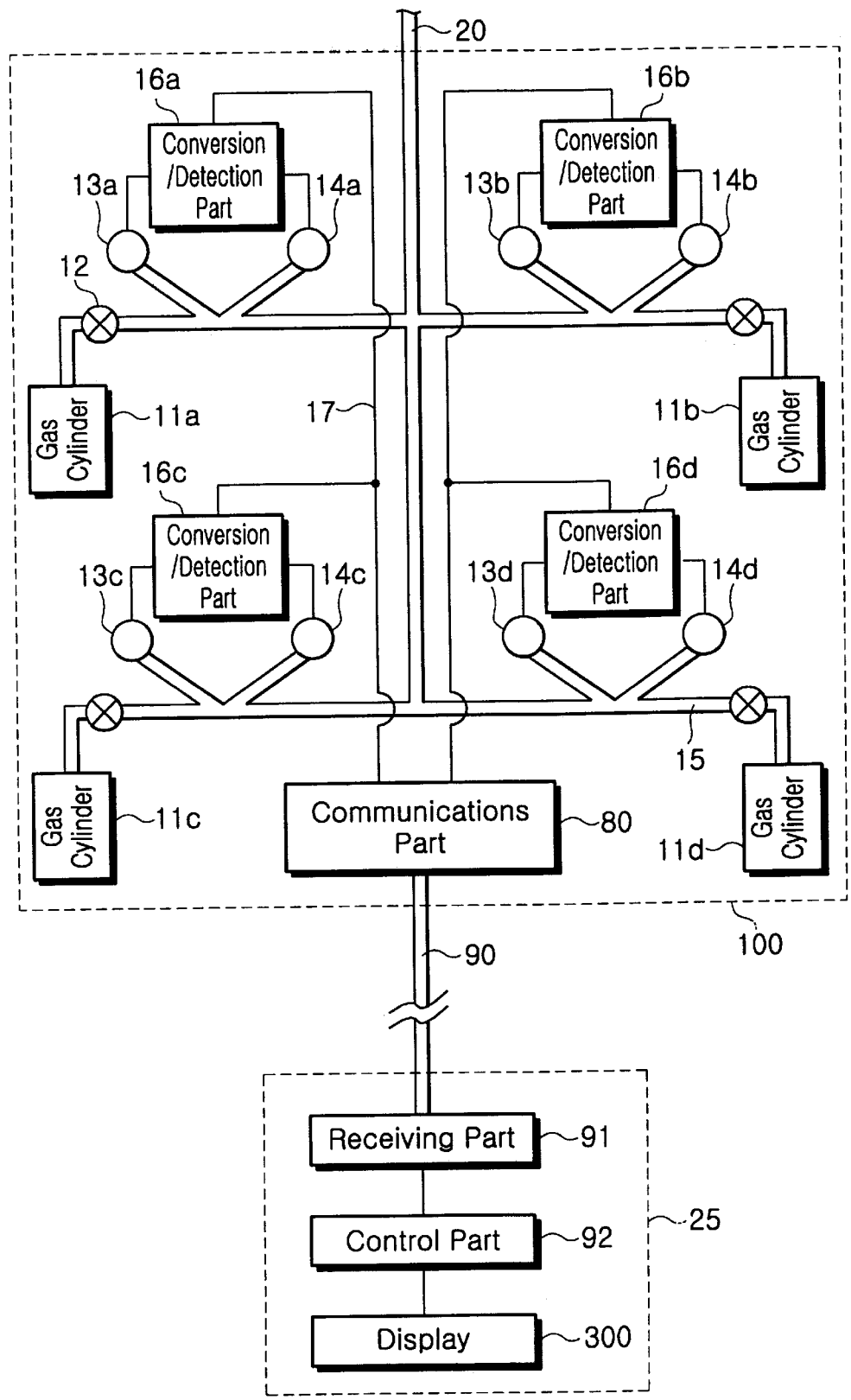
FIG. 3 is a schematic diagram of a gas cabinet according to a preferred embodiment of the present invention.

FIG. 3 is a schematic diagram of a system for checking gas pressure and gas leakage according to a preferred embodiment of the present invention. As shown in FIG. 3, this system comprises a gas storage unit 100 and a process management system 25. The gas storage unit is used in an ion implanter, as shown in FIG. 1, in place of the conventional gas storage unit 10.

The gas storage system 100 comprises gas cylinders 11a, 11b, 11c, 11d; stop values 12a, 12b, 12c, 12d; first measuring instruments 13a, 13b, 13c, 13d; second measuring instruments 14a, 14b, 14c, 14d; sub gas supply passages 15a, 15b, 15c, 15d; conversion/detection parts 16a, 16b, 16c, 16d; a line 17; and a communications part 80. The process management system 25 comprises a receiving part 91; a control part 92; and a display 300. The process management system 25 is connected to the gas storage system 100 by a communications line 90.

The gas cylinders 11a–11d store various gases. The stop valves 12–12d each control the gas supply and the gas intercept to the respective cylinders 11a–11d. The first measuring instruments 13a–13d and the second measuring instruments 14a–14d are each provided on a respective sub gas supply passage 15a–15d, and act to measure the gas pressure when the gas is emitted to sub gas supply passages 15a–15d by the pressure in the respective gas cylinder 11a–11d. The conversion/detection parts 16a–16d are each connected to the respective measuring instruments 13a–13d and 14a–14d. The conversion/detection parts 16a–16d act to convert the pressure measured by the respective measuring instruments 13a–13d and 14a–14d, into electric signals. The conversion/detection parts 16a–16d also act to detect whether any poisonous gas has leaked from the gas cabinet 10 and then to convert the results of this detection into electric signals. The communications part 80 receives the data from the conversion/detection parts 16a–16d as electric signals via the line 17, processes the data, and then transmits the data to the process management system 25 via the communications line 90.

The receiving part 91 receives the data from the communications part 80 via the communications line 90. The control part 92 outputs information to the display 300 based on the signal received by the receiving part 91.

Figure 4:
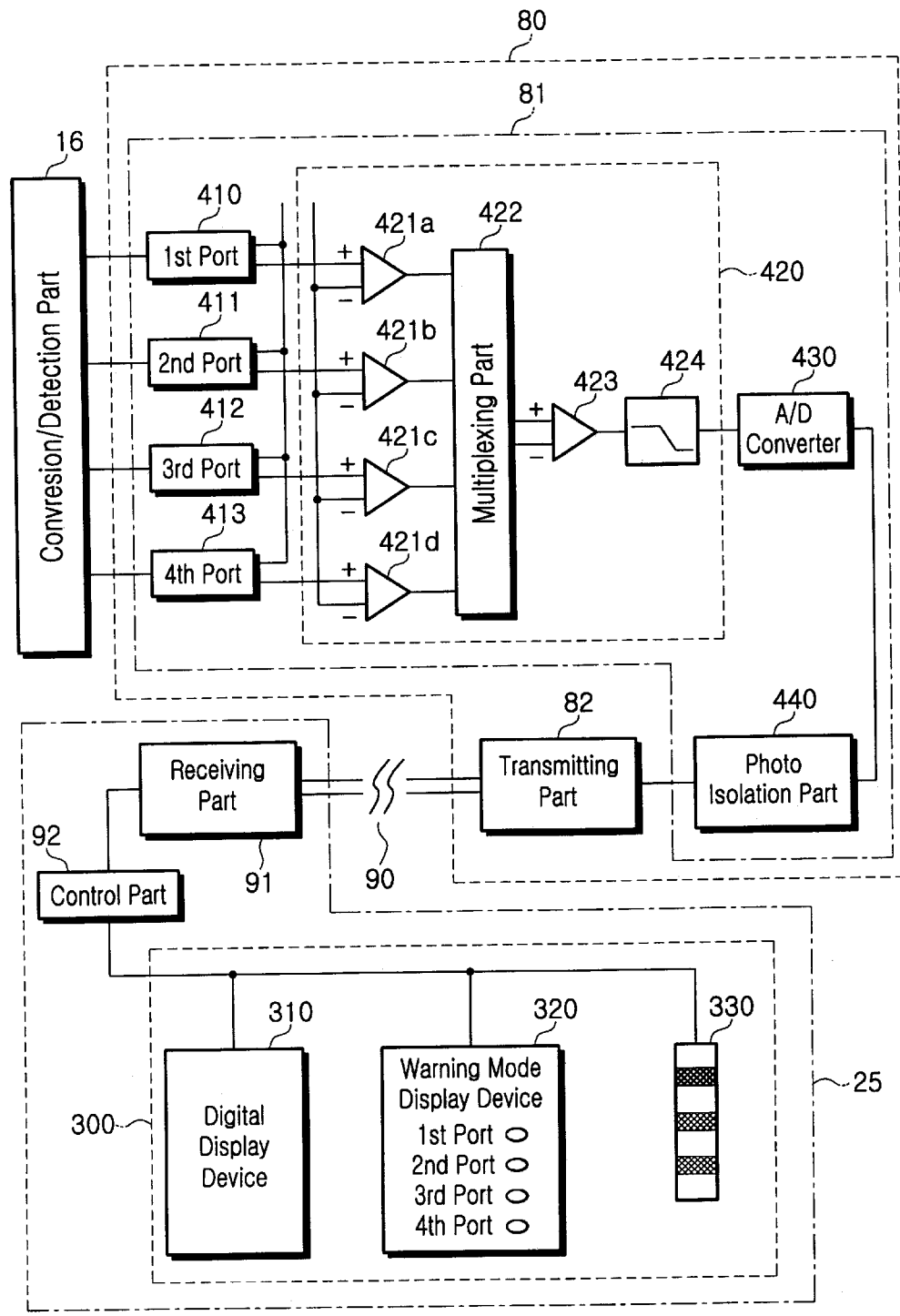
FIG. 4 is a schematic diagram of a system for checking gas pressure and gas leakage according to a preferred embodiment of the present invention.

FIG. 4 is a schematic drawing including a more detailed description of the communications part 80 and the display 300 shown in FIG. 3. As FIG. 4 shows, the communications part 80 comprises a signal processor 81 and a transmitting part 82. The signal processor 81 processes the signal inputted from the conversion/detection parts 16a–16d via a line 17 and transforms the inputted signal into a signal suitable for transmission to the process management system 25. The transmitting part 82 transmits the signal transformed by the signal processor 81 to the process management system 25.

The signal processor 81 comprises of a plurality of ports 410, 411, 412, 413, a signal amplifier 420, an analog/digital (A/D) converter 430, and a photo isolation part 440. The plurality of ports 410, 411, 412, 413 are connected to the conversion/detection parts 16a–16d and act to receive the electric signals from the conversion/detection parts 16a–16d. The signal amplifier 420 amplifies the signal inputted through the ports 410, 411, 412, 413. The A/D converter 430 converts the amplified analog signal to a digital signal. The photo isolation part 440 protects the transmitting part 82 from an incoming overcurrent before the digital signal is inputted to the transmitting part 82.

The a signal amplifier 420 comprises amplifiers 421a, 421b, 421c, 421d, a multiplexing part 422, a gain controller 423, and a filter 424. The amplifiers 421a–421d amplifies the signal inputted through the ports 410. The multiplexing part 422 multiplexes the amplified signal. The gain controller 423 controls the gain of the multiplexed signal. The filter 424 acts to filter the gain-controlled signal.

The transmitting part 82 operates to adjust the digital signal as it passes through the photo isolation part 440. In particular, it adjusts the digital signal such that it is a suitable signal for the communication protocol used. The transmitting part 82 then transmits the adjusted signal to the receiving part 91 as a stream of bits on the communications line 90, and then monitors the transmission state of the digital information.

The operation of the above preferred embodiment of the present invention is described below with reference to FIGS. 3 and 4.

Information on the state of the gas cylinders 11a–11d are obtained by the conversion/detection parts 16a–16d monitoring the respective cylinder 11a–11d. This information is then transmitted to the respective ports 410, 411, 412, 413, where the information signal is amplified by the respective amplifiers 421a–421d. These amplifiers may be operational amplifiers (OP amps) or any other amplifier having suitable operating characteristics.

The signal amplified by the amplifiers 421a–421d is then multiplexed by the multiplexing part 422. Such a multiplexing part 422 can be a multiplexer MUX, or any other device that operates with a similar function.

The gain of the multiplexed signal output from the multiplexing part 422 is then controlled by the gain controller 423. Then, the filter 424 operates to remove noise from the gain-controlled signal. The filter 424 can be a low pass filter (LPF) or any other filter that operates to remove noise.

The filtered analog signal is then successively converted into a digital signal by the A/D converter 430.

The converted digital signal is then passed through the photo isolation part 440, which stabilizes the signal. This protects the transmission part 82 from any incoming overcurrent before the converted signal is inputted to the transmission part 82.

After the digital signal converted by the A/D converter is stabilized by the photo isolation part 440, the digital signal is applied to the transmitting part 82. The transmitting part 82 adjusts the digital signal to a form that is suitable signal for the relevant communication protocol used between the transmitting part 82 and the receiving part 91. The transmitting part 82 then transmits the adjusted signal to the receiving part 91 as a stream of bits on the communications line 90. It also monitors the transmission state of the digital information.

The receiving part 91 receives the stream of bits of the information data on the state of gas in the gas cabinet 100 and the gas cylinders 11a–11d through the communications line 90.

The control part 92 then processes the inputted data into a form suitable for describing the gas system, and outputs the data to the display 300 to inform the process manager of the final data. The display 300 can be constructed as a digit display device 310 showing the information as numbers, a warning mode display device 320 using light-emitting diodes (LEDs), and a warning light 330 informing the process manager of the urgent circumstances such as the leakage or the shortage of gas.

In operation, a high energy of about 150 to 300 kV is generated around the gas cabinet 100 to accelerate the beam produced by the ion source chamber 30 using the acceleration tube 50. This can lead to the formation of a higher electric potential at the gas cabinet 100 and a lower electric phase at the display 300. Such a serious difference between both electric potentials may bring about many disadvantages in transmitting the data between the gas cabinet 100 and the display 300. For this reason, the communications line 90 should be an optic fiber and a specific communications protocol should be used to support the optic fiber.

As mentioned above, the resultant system has many advantages in that the gas cylinder can be changed based upon prearranged circumstances, such as when the pressure of the gas cylinder drops below the desired value. This can significantly reduce the possibility of a serious loss generated when the process equipment is stopped to change a. In addition, the equipment can be easily adjusted for each manufacturing step, thus improving the operating ratio of the equipment. Furthermore, since it is not necessary to open the gas cabinet to determine whether any gas is leaking from the gas cylinder or not, workers are isolated from the poisonous gas, improving the safety of work operations.

What is claimed is:

1. A system for providing gas and checking gas pressure and gas leakage, the system comprising:

two or more gas cylinders;

two or more gas checking units for respectively checking gas pressure in the two or more gas cylinders, for respectively detecting gas leaks from the two or more gas cylinders, and for generating two or more data signals indicating the pressure measured by the respective gas checking units, and any detection of a gas leak by respective gas checking units;

a signal processor for receiving the two or more data signals and converting the two or more data signals into a single converted signal having a format suitable for transmission;

a transmitting unit for transmitting the converted signal received from the signal processor along a communications line; and a display for displaying information based on the transmitted converted signal.

2. A system as recited in claim 1, further comprising a receiving unit for receiving the transmitted converted signal from the transmitting unit and providing the transmitted converted signal to the display.

3. A system as recited in claim 1, further comprising a control unit for controlling the display based on the transmitted converted signal from the transmitting unit.

4. A system as recited in claim 1, wherein the signal processor comprises:

two more ports for respectively receiving the two or more data signals from the two or more gas checking units;

a signal amplifier for amplifying the two or more data signals respectively received by the two or more ports and producing an analog single amplified signal; and an analog-to-digital converter for converting the analog single amplified signal from analog format to the single converted signal in digital format.

5. A system as recited in claim 4, wherein the signal processor further comprises a photo isolation unit for preventing overcurrent loaded into the single converted signal from flowing into a signal transmitting means.

6. A system as recited in claim 4, wherein the signal amplifier comprises:

two or more intermediate amplifiers for respectively amplifying the two or more data signals received at the two or more ports and producing two or more intermediate amplified signals;

a multiplexing unit for multiplexing the two or more intermediate amplified signals and producing a multiplexed signal;

a gain controller for controlling the gain of the multiplexed signal to produce a gain-controlled signal; and a filter for filtering the gain-controlled signal to produce the single amplified signal.

7. A system as recited in claim 6, wherein the two or more intermediate amplifiers each include an operational amplifier.

8. A system as recited in claim 6, wherein the multiplexing unit includes a multiplexer.

9. A system as recited in claim 6, wherein the filter includes a low pass filter.

10. A system as recited in claim 6, wherein the display includes a digital display device.

11. A system as recited in claim 10, wherein the digital display device displays information relating to the gas pressure in the two or more gas cylinders.

12. A system as recited in claim 10, wherein digital display device displays information relating to whether any gas leaks are detected in any of the two or more gas cylinders.

13. A system as recited in claim 1, wherein the display includes a warning mode display device.

14. A system as recited in claim 13, wherein warning mode display device comprises one or more light-emitting diodes.

15. A system as recited in claim 1, wherein the display includes a warning light for warning of the detection of a gas leak in one of the two or more gas cylinders.

16. A system as recited in claim 1, wherein the communications line comprises an optic fiber.

* * * * *